United States Patent [19]

Birkenbach

[11] Patent Number: 4,469,378
[45] Date of Patent: Sep. 4, 1984

[54] LOAD-RESPONSIVE BRAKING PRESSURE CONTROL DEVICE ESPECIALLY FOR VEHICLE BRAKE SYSTEMS

[75] Inventor: Alfred Birkenbach, Hattersheim, Fed. Rep. of Germany

[73] Assignee: ITT Industries, Inc., New York, N.Y.

[21] Appl. No.: 345,865

[22] Filed: Feb. 4, 1982

[30] Foreign Application Priority Data

May 22, 1981 [DE] Fed. Rep. of Germany ....... 3120432

[51] Int. Cl.³ .............................................. B60T 8/22
[52] U.S. Cl. .................................................. 303/22 R
[58] Field of Search ........... 188/195; 303/22 A, 22 R, 303/23 A, 23 R, 6 C

[56] References Cited

U.S. PATENT DOCUMENTS 3,731,981  5/1973  Bueler ................................ 303/22 R
3,749,452  7/1973  Deschenes ......................... 303/22 R

*Primary Examiner*—Duane A. Reger
*Attorney, Agent, or Firm*—James B. Raden; William J. Michals

[57] ABSTRACT

A load-responsive brake pressure control device for vehicle brake systems includes a control valve actuatable by a stepped piston. The stepped piston has one surface of a larger axially effective area which is acted upon in the valve closing direction by the pressure prevailing downstream of the valve, and another surface of a smaller axially effective area which is acted upon in the valve closing direction by the pressure prevailing upstream of the valve. A load-responsive spring acts in the opening direction of the valve on a movable component of a cylinder-and-piston unit, especially on a flange of a cylinder component of such a unit, to urge the same into its initial position in which it abuts a stop surface of a support. The cylinder and piston components of the unit together define a chamber which communicates with a flow path having a stationary portion accommodating a sealing element bounding a passage of a reduced cross section. The stepped piston carries a plunger which penetrates into the passage after a predetermined amount of movement of the stepped piston in the closing direction, so as to entrap the fluid present in the chamber of the unit. Thereafter, further movement of the stepped piston in the closing direction is hindered by the pressure of the entrapped fluid, until this pressure rises to a level at which the movable component of the unit yields in opposition to the spring force. Then, the valve will close and the pressure downstream thereof will be maintained at a level determined by the ratio of the axially effective areas of the aforementioned surfaces of the stepped piston.

12 Claims, 1 Drawing Figure

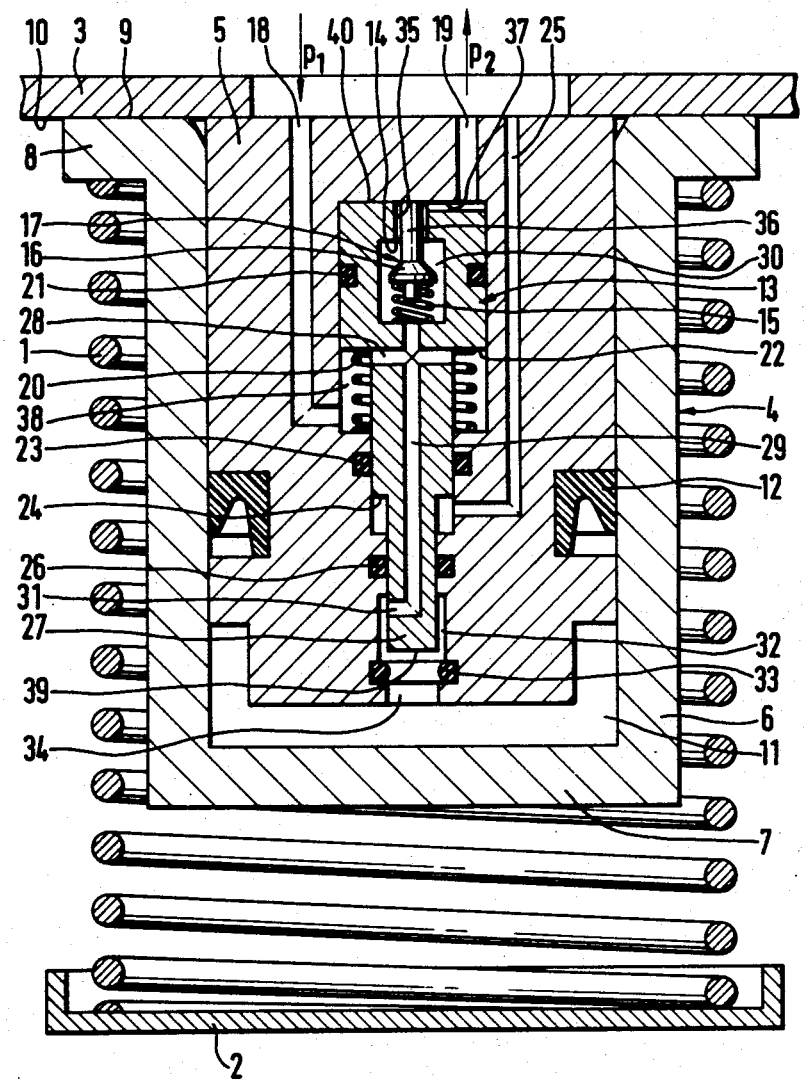

LOAD-RESPONSIVE BRAKING PRESSURE CONTROL DEVICE ESPECIALLY FOR VEHICLE BRAKE SYSTEMS

BACKGROUND OF THE INVENTION

The present invention relates to load-responsive braking pressure control devices in general, and more particularly to a device of this type which is especially suited for use in vehicle brake systems.

In conventional devices of this type, a control valve is actuatable by a stepped piston which is slidable in a housing. The control valve is urged in its closing direction by the outlet pressure which acts on a larger effective surface of the stepped piston and in its opening direction by the inlet pressure which acts on a step of the stepped piston which has a relatively smaller effective surface. A load-responsive spring, in particular a suspension spring supporting the vehicle body on the axle, acts on the stepped piston in the opening direction through the intermediary of a transmitting device.

In a load-responsive braking pressure control device of this type which is disclosed in the U.S. Pat. No. 4,150,855, a suspension spring designed as a compression spring bears against the vehicle body, on the one hand, and against a spring seat element, on the other hand. The spring seat element surrounds the housing for the stepped piston. The spring seat element acts on several radially extending levers. The outer ends of these levers are seated on a vehicle unsprung mass, and their inner ends engage a cap. The levers compress a preloading spring through a pin, and the spring loads the stepped piston. The provision of such levers is necessary in this construction to ensure that only part of the vehicle spring force is transmitted to the stepped piston. The transmitting device resulting therefrom is complicated from the structural and manufacturing points of view. Difficulties are involved in designing the lever ratios such that only a small amount of the force of the suspension spring is transmitted to the stepped piston; this has to be taken into account when choosing the size of the stepped piston. Moreover, the stepped piston is under constant preload. The stepped piston is thus required to be dimensioned in conformity with such continuous load. The stepped piston moves only upon attainment of the changeover pressure defined by the preload. To ensure timely closing of the control valve, the piston stroke until the instant of closing is permitted to be but short. This results in tolerance problems during the manufacture and assembly and in difficulties during the operation.

SUMMARY OF THE INVENTION

Accordingly, it is a general object of the present invention to avoid the disadvantages of the prior art.

More particularly, it is an object of the present invention to provide a load-responsive pressure control device which is particularly suited for use in vehicle braking systems and which does not possess the disadvantages of the conventional devices of this type.

Still another object of the invention is to so construct the device of the type here under consideration that the total extent of the stroke of the stepped piston can be relatively large, and yet the control valve closes quite rapidly after the effective pressure has risen to the change-over point.

It is yet another object of the present invention to so design the device of the above type that the stepped piston need not be dimensioned for withstanding constant loading originating at the load-responsive spring.

A concomitant object of the present invention is to develop a load-responsive pressure control device which is simple in construction, inexpensive to manufacture, and reliable in operation nevertheless.

In pursuance of these objects and others which will become apparent hereafter, one feature of the present invention resides in a load-responsive pressure control device, especially for use in a vehicle braking system between an upstream and a downstream section of a conduit for controling the pressure in the downstream section in dependence on the vehicle load; this device comprising a support having a stop surface; a control valve interposed between the upstream and downstream sections and displaceable between its open and closed positions; means for actuating the control valve, including means for defining an enclosed space having an axis, a stepped piston sealingly accommodated in the space for axial movement and having oppositely facing first and second surfaces respectively having a larger and a smaller axially effective area, means for subjecting the first and second surfaces to the pressures prevailing respectively in the downstream and upstream sections, and means for displacing the control valve between its open and closed positions in dependence on the movement of the stepped piston; and means for applying a load-dependent force to the actuating means, including a cylinder-and-piston unit including a cylinder component and a piston component together bounding a chamber, one of these components being stationary and the other movable relative to the support, resilient load-responsive means for urging the movable component into abutment with the stop surface, means for bounding a flow path into the chamber, including at least a path portion stationary relative to the support, means for forming a passage of a restricted cross-sectional area in the portion path, and a plunger extending into the path portion and connected to the stepped piston for joint movement therewith from a position in which it permits to a position in which it interrupts flow through the passage, so that further movement of the plunger beyond the latter position takes place against the opposition of the urging means as reflected in the pressure prevailing in the chamber. Advantageously, the forming means includes a seal mounted on the stationary component and extending into the path.

In this construction, the stepped piston is not loaded in its inactive position by the load-responsive urging means as the entire spring force is transmitted to the support via the stop surface. During a braking operation, the stepped piston moves, without having to overcome high forces, until it assumes a position in which it penetrates the circumferential seal. It remains in this position until the forces acting on the stepped piston in the closing direction have reached an amount large enough to displace the piston as a plunger into a control pressure chamber which communicates with the chamber bounded by the cylinder and piston components. This occurs when the plunger generates such a pressure in the control pressure chamber that this pressure, multiplied by the effective piston surface of the piston-cylinder arrangement, exerts a force on the movable component which exceeds the preloading force of the load-responsive urging means, such as a spring, especially a vehicle suspension spring. Thereafter, only a small additional stroke of the stepped piston will suffice to close the control valve. This mode of operation applies for any amount of preload of the load-responsive spring.

It will be particularly advantageous to have the piston component fixed to a vehicle component, which thus constitutes the support, and to have the stop surface surround the piston component. In the inactive position, the end face of the cylinder can then directly abut the stop surface.

It is further advantageous for the cylinder component to have at its end face an outer flange which serves as a seat for the load-responsive spring. This results in a space-saving design, inasmuch as the spring surrounds the cylinder component over its entire length. Furthermore the outer flange may be used to increase the magnitude of the area of abutment of the cylinder component with the stop surface.

It is furthermore advantageous, when the housing for the stepped piston is constituted by the piston component of the cylinder-and-piston unit or, in other words, when the space accommodating the stepped piston is formed in the piston component. This accomplishes a compact construction of the device and the shortest possible connection between the space accommodating the pressure control valve and the cylinder chamber.

A control chamber is advantageously provided on the side of the circumferential seal which is remote from the cylinder chamber. This control chamber is in permanent communication with the inlet side of the pressure control device. This avoids the otherwise existing need for the provision of an additional supply device for filling the cylinder chamber.

In this arrangement, the stepped piston may advantageously contain a channel interconnecting the control chamber and the inlet side. A channel of this kind can be made simultaneously with machining the stepped piston, without necessitating much additional effort.

Advantageously, the stepped piston includes a third surface subjected to atmospheric pressure and situated between the plunger and the second surface which is acted upon by the inlet pressure.

BRIEF DESCRIPTION OF THE DRAWING

Above-mentioned and other features and objects of this invention will become more apparent by reference to the following description taken in conjunction with the accompanying drawing, in which:

The sole FIGURE of the drawing is a longitudinal sectional view of a pressure control device of the invention.

DETAILED DESCRIPTION OF THE PREFERRED EMBODIMENT

Referring now to the drawing in detail, it may be seen that a suspension spring 1 extends between an unsprung mass 2 of a vehicle and a sprung mass 3. For example, the unsprung mass 2 is a spring seat connected to the vehicle axle, while the sprung mass 3 is the vehicle body, or the chassis or a similar support.

The pressure control device of the invention includes a cylinder-and-piston unit 4 which incorporates a piston component 5 which is fixed to the vehicle unsprung mass 3 and a cylinder component 6 including an end wall 7 and an outer flange 8 at an end face 9 remote from the end wall 7. The flange 8 serves as a spring seat to support the suspension spring 1. In the inactive position, the end face 9 cooperates with a stop surface 10 which is provided on the sprung mass or support 3 and surrounds the piston component 5. A cylinder chamber 11 is disposed between the piston component 5 and the cylinder component 6 and is sealed at the periphery of the piston component 5 with respect to the exterior of the cylinder-and-piston unit 4 by a seal 12.

The piston component 5 of the piston-cylinder unit 4 bounds an enclosed space which accommodates a stepped piston 13 carrying a valve seat 14 for a closure member 16 of a control valve 17. The closure member 16 is urged towards its closed position by a closure spring 15. The control valve 17 is interposed between an inlet side 18 of the illustrated braking pressure control device which is connectible to a conventional master cylinder by an upstream conduit section, and the outlet side 19 which is connectible to a wheel cylinder via a downstream conduit section. The stepped piston 13 is subjected to the action of a weak return spring 20 and has an end face 40 which is exposed to an outlet pressure $p_2$ prevailing at the outlet side 19, a stepped surface 22 separated from the end face 40 by a seal 21 and exposed to an inlet pressure $p_1$ prevailing at the inlet side 18, a stepped surface 24 separated from the surface 22 by a seal 23 and connected via a channel 25 to atmosphere, and a plunger 27 separated from the surface 24 by a seal 26. The interior of the plunger 27 is provided with a radial channel 28 close to the inlet side 18 and an axial channel 29 commencing thereat. The axial channel 29 extends to a valve chamber 30, on the one hand, and via another radial channel 31 to a control chamber 32, on the other hand. Adjacent to the control chamber 32 is a circumferential seal 33 which sealingly receives the plunger 27 upon axial displacement of the stepped piston 13. Neighboring thereto is a control pressure chamber 34. The closure member 16 of the valve 17 includes a pin 36 which extends through an axial bore 35 of the stepped piston 13 and which normally bears against an end face 37 delimiting an enclosed space 38 receiving the stepped piston 13 in the piston component 5.

It will be appreciated that the large piston component 5 and the stepped piston 13 may each be of a multipart construction to enable assembly of the individual parts.

The illustrated braking pressure control device operates as follows: the suspension spring 1 is compressed by the load of the vehicle and therefore urges the cylinder component 6 to exert a load-responsive force on the stop surface 10. When a braking action is started and the inlet pressure $p_1$ rises by actuation of the master cylinder, the stepped piston 13 moves downwardly as considered in the drawing since the end face 40 has a larger axially effective area than the stepped surface 22 and an end face 39 of the plunger 27 combined and since the inlet pressure $p_1$ acts on all of these surfaces. The stepped piston 13 moves until the plunger 27, after conducting a partial motion, penetrates into a passage bounded by the circumferential seal 33. Thereafter, further motion of the stepped piston 13 is hindered by the fluid entrapped in the control pressure chamber 34 and in the cylinder chamber 11. The control valve 17 has already performed a part of its closing stroke before reaching this position. The stepped piston 13 will remain in this position until the force acting on it as a result of the continuing increase in the inlet pressure $p_1$ becomes so large that the plunger 27 develops such a pressure in the fluid entrapped in the chambers 11 and 34 that the force resulting from the action of this pressure on the axially effective internal surface of of the end wall 7 of the cylinder component 6 exceeds the force of the spring 1. Then the cylinder component 6 will yield and the stepped piston 13 will be able to continue its downward movement. The fluid displaced by the plunger 27 shifts the cylinder component 6 downwardly in opposition to the force of the suspension spring 1. The change-over point is thereby attained, and the control valve 17 closes shortly after that. If the inlet pressure $p_1$ continues to rise, the outlet pressure $p_2$ has a value reduced relative thereto, the amount of the reduction depending upon the ratio of the stepped surface 22 which is acted on by the pressure of the inlet side 18 to the end face 40 which is subjected to the pressure of the outlet side 19.

The housing accommodating the stepped piston 13 can also be arranged outside the cylinder component 5, rather than being constituted by the latter as illustrated in the drawing. In this case, the pressure control chamber 34 will communicate with the cylinder chamber 11 via a connecting conduit.

A braking pressure control device of this kind will also be suited for use in an arrangement in which the load is applied by load-responsive springs other than a suspension spring which supports the vehicle body on the axle.

While I have described above the principles of my invention in connection with specific apparatus, it is to be clearly understood that this description is made only by way of example and not as a limitation to the scope of my invention as set forth in the objects thereof and in the accompanying claims.

I claim:

1. A load-responsive pressure control device, especially for use in a vehicle braking system between an upstream and a downstream section of a conduit for controlling the pressure in the downstream section in dependence on the vehicle load, comprising
   a support having a stop surface;
   a control valve interposed between the upstream and downstream sections and displaceable between its open and closed positions;
   means for actuating said control valve, including
      means for defining an enclosed space having an axis, a stepped piston sealingly accommodated in said space for axial movement and having oppositely facing first and second surfaces respectively having a larger and a smaller axially effective area,
      means for subjecting said first and second surfaces to the pressures prevailing respectively in the downstream and upstream sections, and means for displacing said control valve between its open and closed positions in dependence on the movement of said stepped piston; and
   means for applying a load-dependent force to said actuating means, including
      a cylinder-and-piston unit including a cylinder component and a piston component together bounding a chamber, one of said components being stationary and the other movable relative to said support,
      resilient load-responsive means for urging said movable component into abutment with said stop surface,
      means for bounding a flow path into said chamber, including at least a path portion stationary relative to said support,
      means for forming a passage of a restricted cross-sectional area in said path position, and
      a plunger extending into said path position and connected to said stepped piston for joint movement therewith from a position in which it permits to a position in which it interrupts flow through said passage, so that further movement of said plunger beyond the latter position taken place against the opposition of said urging means as reflected in the pressure prevailing in said chamber.

2. The pressure control device as defined in claim 1, wherein said stationary component is said piston component of said cylinder-and-piston unit.

3. The pressure control device as defined in claim 2, wherein said stop surface surrounds said piston component.

4. The pressure control device as defined in claim 3, wherein said cylinder component has an outwardly extending flange; and wherein said urging means includes a spring bearing against said flange.

5. The pressure control device as defined in claim 4, wherein said spring is a suspension spring of the vehicle.

6. The pressure control device as defined in claim 2, wherein said defining means includes an internal surface of said piston component.

7. The pressure control device as defined in claim 1, wherein said bounding means further bounds a control compartment located at the opposite side of said forming means from said chamber.

8. The pressure control device as defined in claim 7, wherein said bounding means further includes means for permanently connecting said control compartment with the upstream section of the conduit.

9. The pressure control device as defined in claim 8, wherein said permanently connecting means includes a connecting channel in the stepped piston-plunger assembly.

10. The pressure control device as defined in claim 1, wherein said forming means includes a seal mounted on said stationary component and extending into said path.

11. The pressure control device as defined in claim 1, wherein said stepped piston further includes a third surface facing in the same direction as said second surface and subjected to atmospheric pressure.

12. The pressure control device as defined in claim 11, wherein said third surface is disposed between said second surface and said plunger.

* * * * *